UNITED STATES PATENT OFFICE.

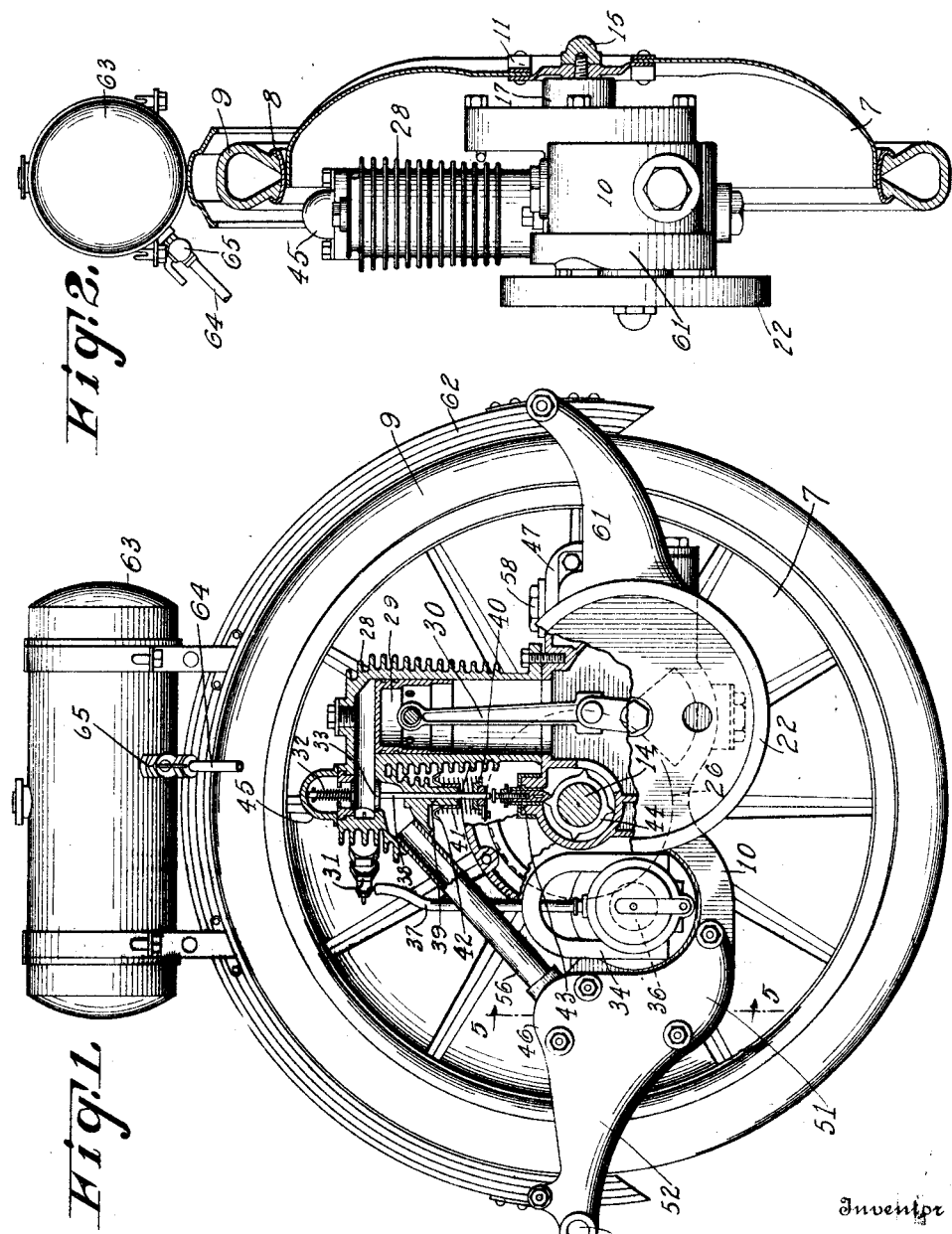

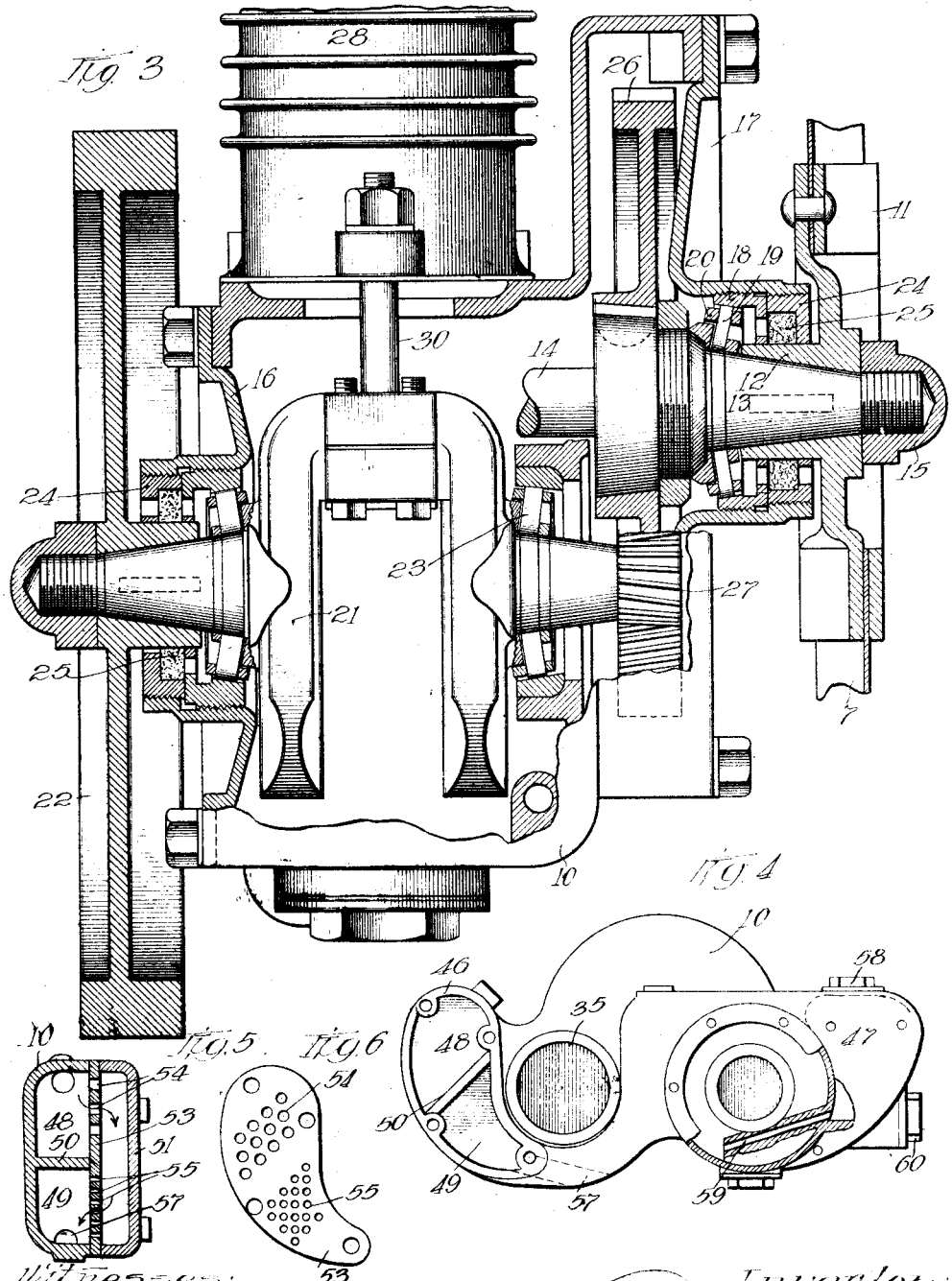

REUBEN STANLEY SMITH, OF LOS ANGELES, CALIFORNIA, ASSIGNOR TO A. O. SMITH COMPANY, OF MILWAUKEE, WISCONSIN, A CORPORATION OF WISCONSIN.

VEHICLE-PUSHER.

1,195,620.  Specification of Letters Patent.  Patented Aug. 22, 1916.

Original application filed August 20, 1914. Serial No. 857,692. Divided and this application filed May 27, 1915. Serial No. 30,766.

*To all whom it may concern:*

Be it known that I, REUBEN STANLEY SMITH, a citizen of the United States, residing at Los Angeles, in the county of Los Angeles and State of California, have invented a certain new and useful Improvement in Vehicle-Pushers, of which the following is a full, clear, concise, and exact description, reference being had to the accompanying drawings, forming a part of this specification.

This invention relates to motors or pushers, and particularly to that class of motors which is arranged to be attached to a vehicle to propel the same, and embodies a wheel adapted to run on the ground at the side or rear of the vehicle, the wheel being provided with a motor adapted to drive it and thus to push or drive the vehicle with which suitable connection is made.

In its preferred form my invention involves an internal combustion engine associated with the drive wheel.

The general objects of my invention are to provide a motor driven pusher of low first cost, of light weight, of strength, of satisfactory operating qualities, and of general efficiency.

The present application is a division of my co-pending application, Serial No. 857,692, filed August 20, 1914. The pusher illustrated in this prior application is illustrated as being connected with a bicycle, but it will readily be understood that the pusher can be used in connection with any kind of a vehicle.

In the preferred embodiment of my invention the pusher wheel is dished and has mounted upon its axle a motor, whereby the weight of the motor and the associated parts is centrally located directly above the point at which the tread of the wheel rests upon the ground. The motor is provided with a casing, or frame, the forward extension of which establishes the connection between the axle of the pusher wheel and the vehicle with which it is connected. Since the weight of the motor is carried upon the axle of the pusher wheel, I have devised a pusher wheel which may be stamped of sheet metal dished to accommodate the motor and still retain the necessary strength required. By this means I secure a light wheel which has a resiliency sufficient to relieve the motor mechanism of the shocks or jars to which it would otherwise be subjected, and which, notwithstanding its radical dish, has the strength necessary to carry the weight of the motor. The wheel is so formed that its distortion is distributed throughout the metal of which the wheel is formed thereby preventing the crystallization which would otherwise occur at or near the points subjected to the greatest strain.

The motor frame is provided with extensions front and rear, these extensions fulfilling their functions as follows: 1. They carry a mud guard over the upper part of the pusher wheel tire upon which is mounted the fuel reservoir. 2. The forward projection serves as a connection with the vehicle frame, and also serves as a means for transmitting the thrust from the pusher wheel to the vehicle. 3. This forward projection serves also as a muffler chamber for muffling the exhaust from the motor. 4. The rearward projection, or extension, serves wholly or in part as a lubricating oil reservoir. Furthermore, the use of these projections, or extensions, of the motor frame to carry the mud guard and fuel reservoir provides a construction such that a pneumatic tire, with which the pusher wheel is equipped, may be removed from its rim without disturbing in any degree the arrangement or interconnection of the other parts of the mechanism. This is a decided advantage because it facilitates the repair or replacement of the tire. This arrangement makes it possible also to remove the pusher wheel from its axle without disturbing any other part of the mechanism; and it also makes it possible to remove the mud guard without disturbing other parts of the mechanism except the connection between the fuel tank and the motor. These and other features of novelty will more fully appear in connection with the detailed description when read in connection with the acompanying drawings in which, Figure 1 is a side elevational view of the pusher wheel of my invention, some of the parts of the pusher wheel being broken away to more clearly reveal the interior construction. Fig. 2 is a vertical sectional view of the pusher wheel, the motor associated therewith being shown in elevation. Fig. 3 is a vertical sectional view of the crank case, showing the crank shaft of the engine and the axle upon which the pusher wheel is mounted. Fig. 4 is a detail view of the engine frame work illustrating the lubricating devices, and that portion of the engine frame which constitutes a part of the muffler mechanism. Fig. 5 is a sectional view taken along the line 5—5 of Fig. 1 and looking in the direction indicated by the arrows; and Fig. 6 is a detail view of the perforated plate which forms a part of the muffler mechanism.

Similar reference characters refer to similar parts throughout the several views.

The improved pusher of my invention comprises a wheel 7 which is radially dished, as is most clearly illustrated in Fig. 2. The wheel, as illustrated in the drawings, is equipped with a rim 8 and a suitable tread, preferably in the form of a pneumatic tire 9.

At 10 I have illustrated the frame work of the engine which serves as a power plant for the improved pusher of my invention. Attention is directed to the fact that owing to the dished conformation of the wheel and the location of the engine thus made possible, the center of gravity of the power plant is located directly over that portion of the tread which engages the road, and, accordingly there is no tendency for the power plant to tip the wheel in either direction.

The hub of the wheel 7 is in the form of a circular plate 11 riveted in position as illustrated. The circular plate 11 is provided with an integral boss 12 provided with a conical bore in which is keyed the conical end 13 of the shaft 14, the other end of said shaft being mounted in suitable roller bearings located on the side of the engine frame work opposite the wheel 7. The wheel 7 is securely positioned upon the shaft 14 by a cap nut 15 threaded upon the right end of the shaft 14, (Fig. 3). As will more fully hereinafter appear, the shaft 14 serving as the axle of the pusher wheel also serves as a cam shaft for the pusher motor. The engine frame is provided on opposite sides thereof with removable cover plates 16 and 17 retained in position by bolts or other equivalent means. The cover plates referred to are preferably stamped from sheet metal and are conically dished to provide strength and rigidity. By providing openings on opposite sides of the motor frame work and by providing cover plates for said openings, as described, the engine crank shaft may be inserted through the opening close by the cover plate 16 and the pusher axle or cam shaft 14, may be inserted through the opening closed by the cover plate 17. The cover plates 16 and 17 are preferably given a circular contour whereby the surfaces of the engine crank case, or housing, to which they are bolted may be circular, thus facilitating and cheapening the machine operation by which these surfaces are finished. Most of the machine surfaces of the engine casing, or housing, are concentric with respect to the surfaces which must be machined for the accommodation of the cover plates, thereby further simplifying and cheapening the machine work of manufacture. The closure plate 17 has threaded thereon a ring 18 provided with an interior conical surface concentric and parallel with the conical surface 13 of the axle or cam shaft 14. Interposed between roller races afforded by the ring 18 and conical end 13 of the shaft 14 is a plurality of rollers 19, preferably confined in a suitable cage 20, as illustrated in Fig. 3.

The motor crank shaft, illustrated at 21, is provided with a light fly wheel 22 and has the left end thereof, Fig. 3, mounted in an adjustable roller bearing substantially like the adjustable roller bearing of the axle or cam shaft 14 hereinbefore described. It will be noted that the right end of the crank shaft 21, Fig. 3, is provided with a suitable conical surface coöperating with a non-adjustable roller bearing indicated as a whole by the reference numeral 23. The lefthand end of the axle, or cam shaft 14, Fig. 3, is suitably mounted in a non-adjustable roller bearing (not shown), substantially like the non-adjustable roller bearing 23 with which the crank shaft 21 is provided.

Attention is directed to the fact that the axle, or cam shaft 14, and the crank shaft 21 are provided with conical extensions by means of which connections with the pusher wheel and fly wheel are effected, and the geometrical surfaces of these conical extensions are expected to serve as the conical bearing members upon which the rollers of the adjustable bearings ride. A single grinding operation therefore is sufficient to provide both the bearing surface and the surface engaged by the hub of the wheel with which connection is made.

The adjustable bearings with which the crank shaft 21 and axle, or cam shaft 14, are provided, are equipped with externally threaded lock nuts 24 which serve not only to maintain the bearings in alinement, but which also serve as housing for felt oil rings or washers 25. It will be seen that the structure just described is designed to permit the adjustment of both bearings of each shaft by the adjustment of the bearings at one end only.

The axle, or cam shaft 14, has fixed thereon a gear 26 meshing with the pinion 27 carried by the engine crank shaft. The connection between the crank shaft and axle, or cam shaft, is in an 8 to 1 ratio for a reason to be subsequently explained. Inasmuch as the pusher wheel is keyed upon the axle, or cam shaft 14, it will be seen that the gearing just described serves as the transmission through which the pusher wheel is driven from the engine crank shaft.

Bolted, or otherwise secured, upon the engine crank case is a working cylinder 28 in which reciprocates a working piston 29 operatively connected with the crank shaft by the usual pitman rod 30. The cylinder 28 is provided with a suitable spark plug 31, and intake and exhaust valves shown, respectively, at 32 and 33.

The engine is provided with a suitable ignition magneto 34 disposed in an opening in the engine frame just forward of the cylinder, and is provided with a circular boss or flange surrounding one end of the magneto shaft, the engine frame being provided with a corresponding surface 35 to which the magneto is bolted, as is most clearly illustrated in Fig. 4. As is most clearly illustrated by dotted lines in Fig. 1, the magneto shaft is provided with a driving pinion 36 which meshes with the cam shaft gear 26, the method of mounting the magneto being such as to insure its alinement and the proper spacing between its shaft and the axis of the cam shaft. The engine frame is arranged in such manner as to expose the timer mechanism of the magneto thereby making it readily accessible for adjustment or repair. The means by which the magneto is mounted makes it possible also to remove it entirely from the engine without disturbing or removing other parts in case such removal becomes necessary. One terminal of the magneto is grounded, and the other terminal is connected by means of a suitable conductor 37 with the insulated terminal of the spark plug 31, thereby reducing the wiring of the ignition system to a minimum, and confining the magneto and the electrical connection between it and the spark plug to a position within the dish of the pusher wheel, and thus protecting it from water in the case of rain and from the mud splash of the vehicle or pusher wheel.

The inlet valve 32 of the engine cylinder is of the usual type and is provided with a spring normally holding it upon its seat, the valve being opened when suction is created in the engine cylinder in a manner well known to those skilled in the art of internal combustion engine construction. The exhaust valve 33 has attached thereto a rod 38 passing through a boss 39 formed integral with the engine cylinder. Carried by the rod 38 near the lower end thereof is a collar or washer 40, which serves as an abutment for the spring 41, normally tending to hold the exhaust valve 33 upon its seat. The end of the spring 41 opposite the washer, or collar, 40 abuts against a forked spacer 42 which keeps the spring in a position a considerable distance from the valve rod 38 and the boss 39 thereby permitting air to circulate freely between the convolutions of the spring to keep it cool and thus preserve its temper.

As is most clearly illustrated in Fig. 1, the exhaust valve is operated by a plunger 43 which in turn is operated by a four toothed cam 44 fixed upon the cam shaft 14. It will be understood that every time the plunger 43 is operated by the cam 44 the exhaust valve 33 will be moved to its open position against the tension of its associated spring 41. The carbureter 45 is bolted, or otherwise secured, directly to the valve casing of the engine, thus dispensing with a manifold and securing an advantage in carburetion due to the heat of the engine.

The engine frame is provided with front and rear extensions illustrated respectively at 46 and 47. The forward projection 46 is conformed to provide two chambers 48 and 49, said chambers being separated by a suitable wall 50. Secured to the projection 46 by stud bolts, or other equivalent means, is a cast and slightly dished plate 51 having an arm 52 extending forwardly from the projection 46. Interposed between the plate 51 and the projection 46 of the engine frame is a plate 53, illustrated in detail in Figs. 5 and 6, this last mentioned plate having a plurality of relatively large apertures 54 affording connection between the chamber 48 and the space between the plates 51 and 53. A plurality of relatively small apertures 55 in the plate 53 afford connection between the chamber 49 and the space between the plates 51 and 53, as most clearly illustrated in Fig. 5. A pipe 56 affords connection between the chamber 48 and the exhaust port of the engine. A passage 57 affords connection between the chamber 49 and the atmosphere. It will be understood that the parts just described constitute a muffler, the exhaust gases taking the path indicated by the arrows in Fig. 5.

The rear projection 47 of the engine frame serves as a reservoir for lubricating oil, the lubricating oil being admitted to the space within the projection 47 through an opening normally closed by a suitable plug 58. A passage 59 leads from the bottom of the oil reservoir to a space in the engine crank case slightly below the normal oil level thereof. It will be understood that the oil reservoir is tight and that the crank case is capable of containing a considerable quantity of lubricating oil in the bottom thereof in order that the operating parts of the engine may be lubricated by the splashing of the oil within the crank case. When the level of the oil in the crank case falls below the orifice of the oil passage 59 air bubbles up through the oil reservoir to permit the flow of oil into the crank case. As soon as a sufficient quantity of oil has then been permitted to pass into the crank case the oil in the crank case will submerge the orifice of the passage 59 and thus prevent the further flow of lubricating oil. The oil reservoir is preferably provided with an outlet opening normally closed by a plug 60. Attention is directed to the fact that the cam mechanism 44, for operating the exhaust valve, is so designed that it is lubricated by the oil splashing within the crank case. Secured to the projection 47, as most clearly illustrated in Figs. 1 and 2, is a rearwardly projecting arm 61 which serves to support one end of the mud guard 62 passing over the pusher wheel. The other end of the mud guard 62 is supported by the forwardly projecting arm 52 of the plate 51, as is most clearly illustrated in Fig. 1.

Removably mounted upon the mud guard 62, as is most clearly illustrated in Figs. 1 and 2, is a fuel tank 63, the connection between the fuel tank and the carbureter being established by a tube 64. Preferably interposed between the connection between the fuel tank and the carbureter is a stop cock, illustrated at 65. The forwardly projecting arm 52 is provided with an aperture 66 so that connection to the vehicle may be made. Any suitable connecting means may be employed and I have, therefore, thought it unnecessary to illustrate a connector. It will be noted that the fly wheel 22 and the traction wheel 7 rotate in opposite directions due to the fact that they are connected by the intermeshing gears 26 and 27 intervening between the crank shaft 21 and the axle 14. The rotation of the fly wheel 22 at a high rate of speed produces a gyroscopic effect which, if not neutralized, would interfere with the steering qualities of the bicycle with which the device is connected. Since, however, the traction wheel 7 rotates in a plane parallel with that in which the balance wheel rotates, but in the opposite direction, the gyroscopic effect of the balance wheel is wholly or partly neutralized by the gyroscopic effect of the traction wheel. The two gyroscopic effects may be completely counter-balanced, and thus neutralized, by proper proportion of the parts and proper distribution of weight when taken in connection with the relative speeds at which the parts rotate.

While I have illustrated my invention in the particular embodiment herein shown and described, I appreciate the fact that a great many changes may be made therein without departing from the spirit of my invention.

What I claim as new and desire to secure by Letters Patent of the United States is:

1. In a device of the class described the combination of a traction wheel, an axle rigidly attached to said wheel and extending from one side thereof, an internal combustion engine rotatably mounted upon said axle and supported substantially entirely thereby, an engine valve actuating cam mounted upon said axle, a crank shaft for said engine, means for operatively connecting said crank shaft and said axle, and means for connecting the frame of the engine with the frame of a vehicle.

2. A device of the class described comprising in combination a dished driving wheel, an axle for said driving wheel fixed relatively thereto, an engine mounted on said axle and disposed in said wheel, the center of gravity of the wheel and engine being located substantially in the plane of the rim of said driving wheel, said axle constituting one of the operating shafts of said engine, a crank shaft for said engine, and means for operatively connecting the crank shaft with said axle.

3. A device of the class described comprising in combination a driving wheel, an axle for said driving wheel, an engine mounted on said axle, said engine having a valve communicating with the engine cylinder and a crank shaft, means on said axle for causing cyclic operation of said valve, and mechanism for connecting the axle and crank shaft.

4. A device of the class described comprising in combination a driving wheel, an axle for said driving wheel, an engine mounted on said axle, said engine having an exhaust valve and a crank shaft, a cam on said axle for causing cyclic operation of said exhaust valve, mechanism connecting said axle and crank shaft, and means for mechanically connecting the engine frame with a vehicle frame whereby the thrust of the pusher wheel is transmitted to the vehicle and whereby the engine frame is held in fixed position so that the pusher wheel is driven when the engine is operated.

5. A device of the class described comprising a pusher wheel, an axle for said pusher wheel, an engine mounted on said axle and connected in driving relation thereto, said engine comprising a frame having front and rear projections, a mud guard carried by said projections, a fuel supply tank supported by said mud guard, and means for transmitting the thrust of the pusher wheel from the forward projection to the frame of a vehicle.

6. A unitary pusher structure comprising in combination a dished pusher wheel, an axle for said pusher wheel, an engine supported on said axle and disposed in the dished side of the wheel, a crank shaft for said engine, means for operatively connecting the crank shaft with the said axle, said engine comprising a frame having front and rear projections, a mud guard carried by said projections and extending over the pusher wheel, and a fuel supply tank carried by said mud guard.

7. A unitary pusher structure comprising in combination a pusher wheel, an axle for said pusher wheel, an engine mounted on said axle, a crank shaft for said engine, means operatively connecting the crank shaft with said axle, said engine comprising front and rear projections, and a mud guard secured to said front and rear projections and extending over the pusher wheel.

8. A unitary pusher structure comprising in combination a pusher wheel, an axle for said pusher wheel, an engine mounted on said axle, said engine comprising a frame, an exhaust valve and a crank shaft, means operatively connecting the crank shaft with said axle, means on said axle arranged to cyclicly operate said exhaust valve, front and rear projections on said frame, and a mud guard supported by said frame and extending over the top of the pusher wheel.

9. A unitary vehicle pusher structure comprising in combination a pusher wheel, an engine supported by the pusher wheel and connected in driving relation thereto, said engine comprising a frame having front and rear projections, means for connecting one of said projections with the frame of an associated vehicle, and muffler mechanism in one of said projections.

In witness whereof, I hereunto subscribe my name this 17th day of April, A. D. 1915

R. STANLEY SMITH.

Witnesses:
LEVERETT C. WHEELER,
IRMA D. BREMER.